Nov. 23, 1948.  E. SIEMERS  2,454,617
WELDING ELECTRODE HOLDER
Filed Jan. 21, 1944  2 Sheets-Sheet 2
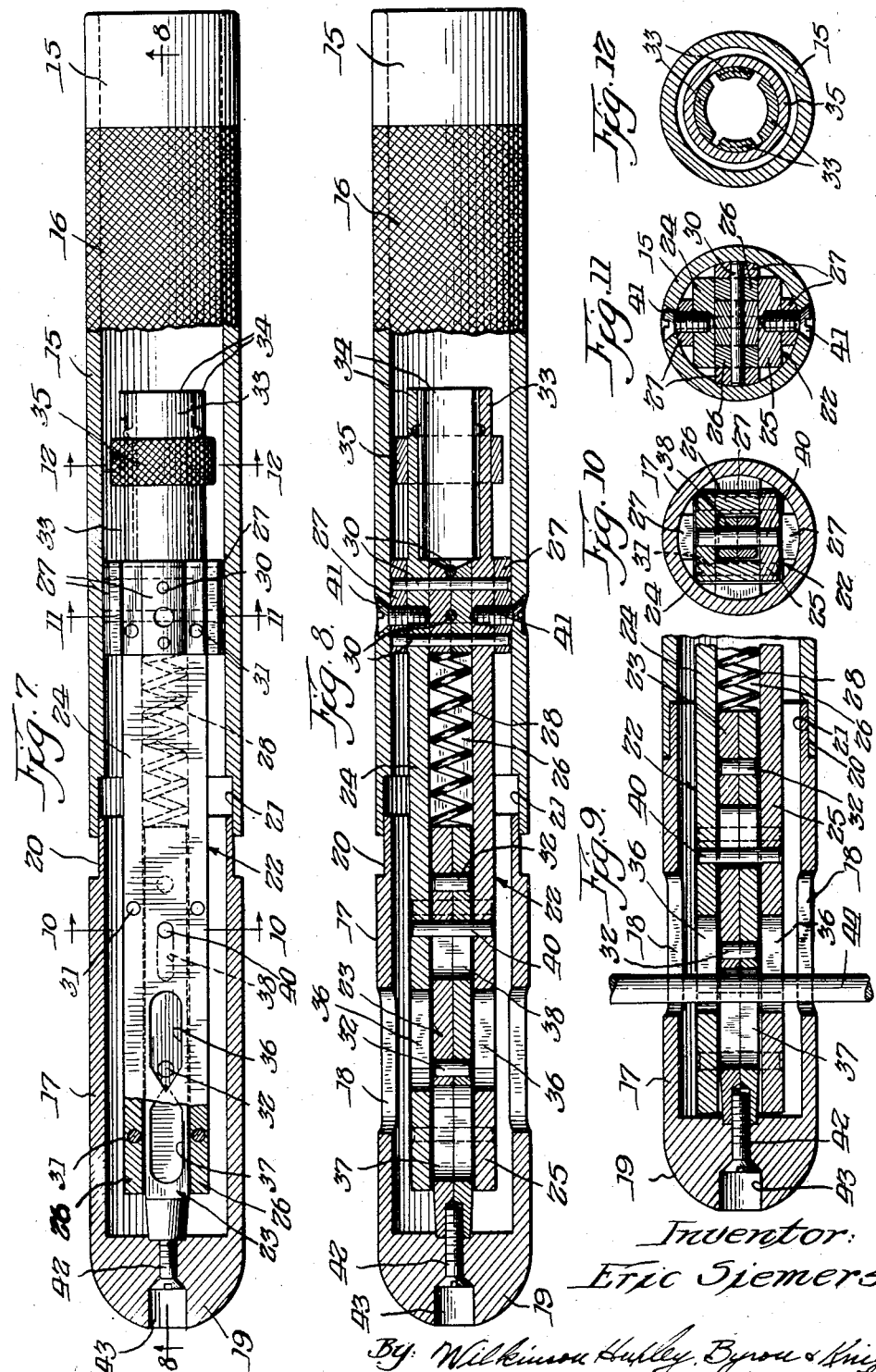
Inventor:
Eric Siemers:
By Wilkinson Hulley, Byron & Knight
Attys.

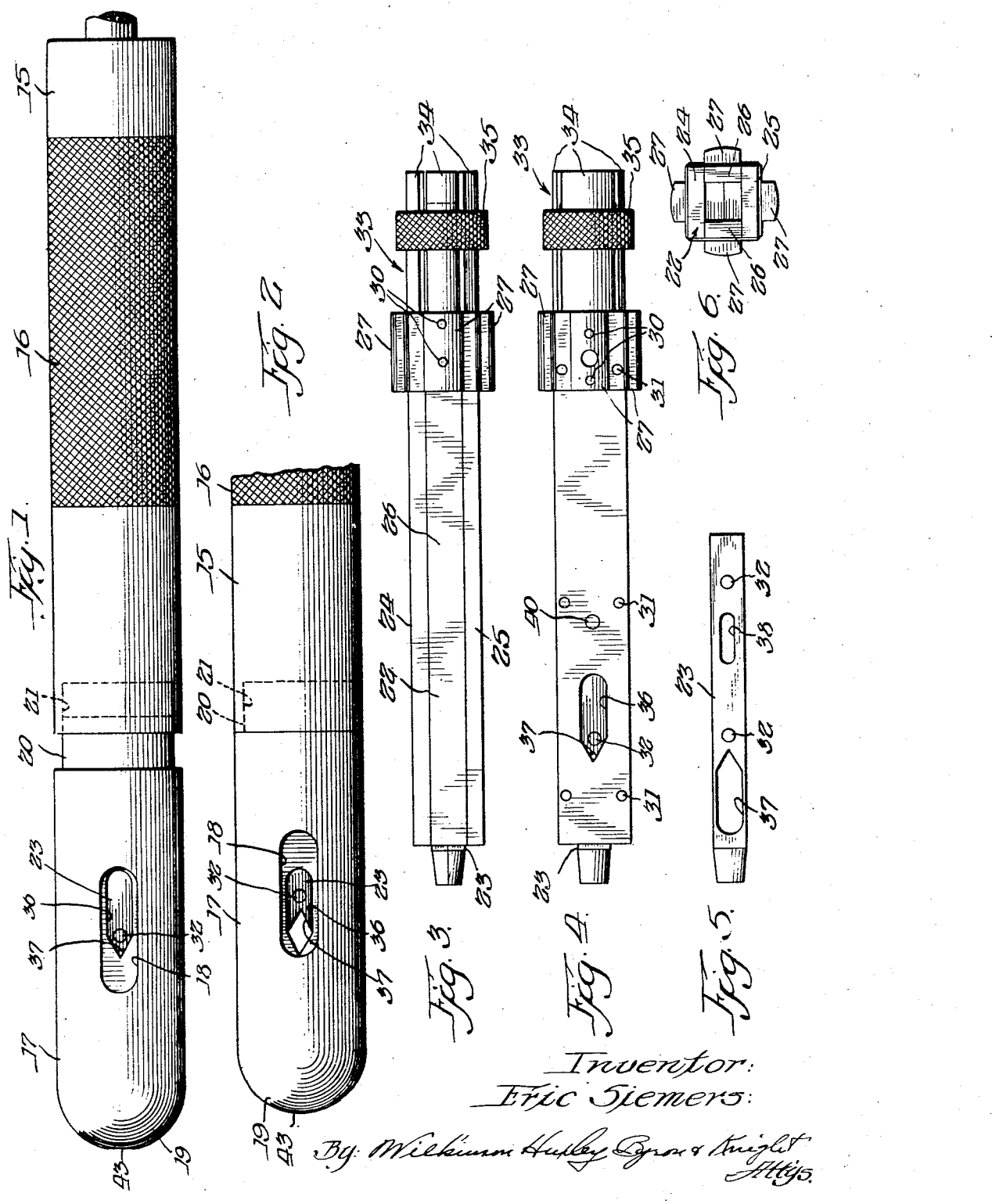

Patented Nov. 23, 1948

2,454,617

UNITED STATES PATENT OFFICE 2,454,617

WELDING ELECTRODE HOLDER

Eric Siemers, Kalamazoo, Mich., assignor, by mesne assignments, to Lacey-Webber Co., Kalamazoo, Mich., a corporation of Michigan Application January 21, 1944, Serial No. 519,122

1 Claim. (Cl. 219—8)

The invention relates to welding electrode holders and has reference more particularly to an improved holder of this type having remarkable electrical conductivity, which will be strong and rugged in construction and economical to manufacture.

Another object of the invention is to provide a holder of simplified construction, which will be light in weight, having relatively few parts, and which will operate in an improved manner to grip a welding electrode. The light weight of the holder and its high electrical conductivity are due in a large measure to the aluminum alloy used in the metal parts and which parts are laminated for increased strength. Adequate strength is thereby obtained to withstand the abuse to which these devices are subjected in actual use.

The temperature of an electrode holder in operation depends chiefly on the conductivity of the material used in its construction. A holder carrying a current higher than its maximum capacity becomes heated. This produces not only molecular reorientation, causing ultimate physical break-downs, but also increases the electrical resistance, thus lowering in turn the capacity of the device. A sustained high temperature adversely affects the life of the insulating covers protecting the metal parts, and furthermore, the operator works more efficiently with a cool holder. Therefore, another object of the invention is to provide a holder for welding purposes capable of carrying a current of high amperage without a material rise in temperature.

Another object is to provide a welding electrode holder that can be completely insulated by tubular insulating members, which are readily applied to or removed from the device, and which adequately protect the metal parts against short circuiting.

With these and various other objects in view, the invention may consist of certain novel features of construction and operation as will be more fully described and particularly pointed out in the specification, drawings and claim appended hereto.

In the drawings which illustrate an embodiment of the invention and wherein like reference characters are used to designate like parts—

Figure 1 is an elevational view of the welding electrode holder of the invention;

Figure 2 is a fragmentary elevational view illustrating a retracted position of the gripping jaws for receiving a welding electrode;

Figure 3 is a plan view of the metal parts of the holder in assembled relation with the insulating covers removed;

Figure 4 is a side elevational view of said metal parts as shown in Figure 3;

Figure 5 is a plan view showing the movable jaw member;

Figure 6 is an end view of the body member shown in Figures 3 and 4 with the movable jaw withdrawn;

Figure 7 is a longitudinal sectional view of the complete holder to more clearly illustrate the operation of the associated jaw members;

Figure 8 is a longitudinal sectional view taken substantially along line 8—8 of Figure 7;

Figure 9 is a fragmentary sectional view illustrating the action of the gripping jaws when gripping an electrode;

Figure 10 is a transverse sectional view taken substantially along line 10—10 of Figure 7;

Figure 11 is a transverse sectional view taken substantially along line 11—11 of Figure 7; and Figure 12 is a transverse sectional view taken subtantially along line 12—12 of Figure 7.

The welding electrode holder of the invention essentially consists of a two-piece metal body member shown in Figures 3 and 4 which provides the gripping jaws and which is insulated by covers, as shown in Figure 1, whereby the metal parts of the holder are adequately insulated, thus eliminating the possibility of short circuiting when the holder is laid on metal which is grounded. The insulating cover 15 is tubular throughout, having a portion of its periphery knurled as at 16. The insulating cover 17 is provided with an elongated opening 18 for the reception of the electrode. The forward end of said cover 17 is rounded as at 19 and the end opposite thereto is reduced in diameter as at 20 for interfitting relation with the recessed part 21 in cover 15.

The main body member of the holder comprises an elongated box-like structure 22. A plunger 23 is adapted to fit within the part 22, having reciprocating movement with respect thereto. Said part 22 includes top and bottom members 24 and 25 and side members 26. Figure 6 shows the manner in which the members are assembled to form a substantially square opening interiorly of the part 22 and which extends for the greater portion of the length of the same. The plunger 23 is substantially square in cross section and of a size to fit within the square opening in the main body member. Figure 8 shows the plunger 23 in assembled relation with the coil spring 28 located in the base of said opening.

The body member and plunger of the present holder are preferably formed of an aluminum alloy which combines the light weight of aluminum with the strength of steel. The aluminum alloy also has remarkable electrical conductivity with the result that the present holder is able to carry a current of high amperage without excessive heating. To increase the strength of the holder above that which can be obtained through the use of the special aluminum alloy the invention contemplates a laminated construction for part 22 and plunger 23. The top member 24 and bottom 25 are suitably united to the side members 26 as by the use of dowel pins 30 and similar dowel pins 31 are used, having location at intervals along the length of part 22. Accordingly, the laminations may be considered as riveted together. It is also possible to join the members by bonding, using any of the well known plastics capable of securely uniting the metal parts to each other. The plunger 23 consists of two flat strips of said aluminum alloy riveted in a manner as above described by means of dowel pins 32. As regards said plunger, it is also possible to unite the two metal strips by bonding in the well known manner. The laminated construction of the main body member and plunger, forming the metal parts of the present holder, increases their strength to resist flexing and better electrical conductivity is also secured.

The electrical connection to the holder is made by the cable connector indicated in its entirety by numeral 33. Said connector comprises a plurality of tongues 34 and a pressure ring 35. The tongues are integral with the members 24, 25 and 26, respectively. The ring 35 may be moved longitudinally of the tongues and when in retracted position toward the left the cable is inserted centrally of the connector, the same having electrical contact with said tongues 34. Pressure is applied thereto to hold the parts in connected relation by moving ring 35 to its right hand position, as shown in Figures 3 and 4.

The main body member 22 is provided with an elongated opening 36 having a special V-shaped formation at its left hand end. Said opening is formed in the top and bottom walls 24 and 25, as shown in Figures 8 and 9. An opening 37 of similar shape is provided in the plunger 23 except that the special V-shaped end is located at the right hand extremity of the opening. The parts thus function as gripping jaws for holding an electrode. The openings 36 and 37 are located relative to each other so that when the plunger is in forward position, as in Figures 7 and 8, the said openings do not coincide, but on the contrary, opening 37 in the plunger is to the left, being maintained in this relation by the spring 28. A second opening 39 in the plunger is adapted to receive the retaining pin 40 and thus the extent of movement of the plunger with respect to the body member 22 is limited.

The tubular insulating cover 15 is secured to the main body member 22 by the screws 41 which have threaded relation with the bosses 27 and with the top and bottom members 24 and 25, as will be clear from Figure 8. The bosses have an outside diameter to closely fit the inside of the insulating cover 15 and in the embodiment disclosed four bosses are provided, one on each member of the part 22. Said bosses are secured in place by the dowel pins 30 or they may be bonded as previously described either with or without the dowel pins.

Cover 17 is secured to the left end of the plunger 23 by the screw 42 which is received by recess 43 formed in the rounded end 19 of said cover. Movement of the plunger to a retracted position is therefore effected by movement of the cover 17 in a direction toward cover 15. The reduced portion 20 has a length to permit said movement and recessed portion 21 is likewise designed for said movement.

The operation of the holder in gripping an electrode is relatively simple. The operator applies pressure to the end of the insulating cover 17 to retract the plunger 23 against the tension of spring 28. This movement of the plunger brings the openings 36 and 37 into substantial alignment and the electrode 44 is then inserted. The cover 17 is now released and the electrode is gripped by the jaws as clearly illustrated in Figure 9, the said electrode being engaged by the V-shaped ends of said openings. The spring 28 will hold the electrode in gripped relation until released.

The metal preferred for the present holder is an aluminum alloy of the following composition:

| | |
|---|---|
| Pure aluminum | 93.6 |
| Copper | 4.4 |
| Manganese | .5 |
| Magnesium | 1.5 |

The alloy is of the type generally used for aircraft production because of its excellent physical properties. The metal is resistant to electrolytic corrosion while the addition of copper facilitates cold forming. By laminating the metal parts a light weight holder is secured of great strength. The laminations can be either riveted, bonded, or both. In uniting the metal parts to each other by using a plastic the same may be applied as a liquid or a thin tape of the plastic may be laid between the surfaces to be joined. By the application of heat and pressure a secure bond is produced.

The aluminum alloy preferred for the metal parts of the holder has a thermal conductivity of 486 against 913 for copper. This low conduction factor prevents the travel of the welding heat from the nose to the handle to a greater extent than in devices as heretofore constructed. The electrical conductivity has been proven under actual tests. The holder has carried a current of 350 amperes with a temperature rise of only 50° above a starting point of 32° F. This low temperature operation materially adds to the life of the holder since the metal and also the insulating covers last longer. Also the welder works more efficiently with a cool holder.

What is claimed is:

A welding electrode holder, in combination, elongated metal top and bottom members having side members secured thereto to form a hollow body member of susbtantially square cross section, a metal plunger located within said body member and adapted to reciprocate therein, resilient means within the hollow body member for maintaining the plunger in a forward position with its forward end protruding, means limiting the extent of reciprocating movement of the plunger, the top and bottom members adjacent the forward end of the body member having aligned openings for receiving an electrode, said plunger also having an opening therein for receiving the electrode whereby the body member and plunger comprise gripping jaws, said opening in the plunger being so positioned that the same does not coincide with the openings in the body member except when the plunger is retracted against the tension of the resilient means, and tubular covers of insulating material for completely insulating the metal body member, one of said covers having securement to the body member and the other cover being secured to the protruding end of the plunger.

ERIC SIEMERS.

REFERENCES CITED

The following references are of record in the file of this patent:

UNITED STATES PATENTS

| Number | Name | Date |
|---|---|---|
| 1,425,440 | Beiswinger et al. | Aug. 8, 1922 |
| 1,518,084 | Lovelace | Dec. 2, 1924 |
| 2,118,274 | Sweda | May 24, 1938 |
| 2,220,783 | Fitch | Nov. 5, 1940 |
| 2,265,135 | Hackmeyer | Dec. 9, 1941 |
| 2,288,994 | Del Bene | July 7, 1942 |

FOREIGN PATENTS

| Number | Country | Date |
|---|---|---|
| 408,364 | Great Britain | Apr. 12, 1934 |
| 445,863 | Great Britain | Apr. 15, 1936 |
| 486,562 | Great Britain | June 7, 1938 |